United States Patent [19]
Pahl et al.

[11] Patent Number: 5,286,010
[45] Date of Patent: Feb. 15, 1994

[54] ROLLING-LOBE AIR SPRING

[75] Inventors: Hans-Joachim Pahl, Ronnenberg; Wolfgang Bach, Hanover, both of Fed. Rep. of Germany

[73] Assignee: Continental Aktiengesellschaft, Hanover, Fed. Rep. of Germany

[21] Appl. No.: 971,360

[22] Filed: Nov. 4, 1992

[30] Foreign Application Priority Data

Nov. 6, 1991 [DE] Fed. Rep. of Germany ....... 4136460

[51] Int. Cl.$^5$ .............................. F16F 9/05; F16J 3/04; B60G 11/27
[52] U.S. Cl. ................. 267/64.24; 267/122; 267/64.27
[58] Field of Search ............... 267/64.27, 64.23, 64.24, 267/64.19, 64.21, 122

[56] References Cited

U.S. PATENT DOCUMENTS 3,897,941 8/1975 Hirtreiter et al. ................. 267/64.24
4,763,883 8/1988 Crabtree ........................... 267/64.24
4,988,082 1/1991 Pees .................................. 267/122

Primary Examiner—Matthew C. Graham
Agent, Attorney or Firm—Walter Offesen

[57] ABSTRACT

The invention is directed to a rolling-lobe air spring having a flexible member made of elastomeric material. The flexible member defines the wall of the air spring and includes a reinforcement layer with two mutually-crossing cord-fabric layers. A rolling lobe is formed during the operating state of the air spring and changes with the reciprocating air spring action. An additional rubberized double-layer fabric having two mutually-crossing cord layers is arranged in the flexible member of the air spring in order to reduce the installation space needed for accommodating the air spring. This additional double-layer fabric extends directly from the clamped end region which lies opposite the rolling lobe and extends in the direction of the longitudinal axis of the air spring or only partially over the non-rolling region of the flexible member. The thread angle of the additional cord-fabric layers is less than the thread angle of the reinforcement layer.

5 Claims, 4 Drawing Sheets

ROLLING-LOBE AIR SPRING

FIELD OF THE INVENTION

The invention relates to a rolling-lobe air spring made of elastomeric material having a reinforcement layer unit comprising two mutually-crossing cord-fabric layers. The air spring is defined by a flexible member having two ends attached to respective connecting parts. During operation, the flexible member of the air spring defines a rolling lobe which moves with the spring action.

BACKGROUND OF THE INVENTION

Rolling-lobe air springs have been widely used with success as motor-vehicle springs and especially for suspending the wheel axles of trucks and busses. The flexible member of the air spring is attached at one end to a roll-off piston which is usually made of metal or plastic. In the operating state, the piston moves within the flexible member which is pushed over the roll-off piston and defines a rolling lobe which rolls over the outer surface of the roll-off piston.

Technical problems often occur when mounting the rolling-lobe air spring in that the installation space available is very limited and, for example, individual components of the suspension assembly restrict installing the rolling-lobe air spring.

SUMMARY OF THE INVENTION

It is an object of the invention to provide a rolling-lobe air spring which needs less installation space without significantly affecting the physical characteristics of the air spring.

The rolling-lobe air spring of the invention is for attachment to first and second attachment parts, respectively, the second attachment part including a roll-off piston. The rolling lobe air spring includes: an annular wall defining a longitudinal axis and being a flexible member made of elastomeric material; the annular wall having first and second longitudinal end portions for attachment to the first and second attachment parts, respectively; the annular wall having a rolling lobe formed therein which moves over a pregiven longitudinal portion of the annular wall as the longitudinal portion rolls back and forth over the roll-off piston during the operation of the air spring; the first longitudinal end portion lying opposite the rolling lobe; reinforcement layer means including two mutually crossing rubberized cord fabric layers arranged in the annular wall; a rubberized double-layer fabric arranged in the annular wall so as to extend in the direction of the axis from the first longitudinal end portion while remaining clear of the pregiven longitudinal portion; the double-layer fabric having threads defining a first thread angle and the cord fabric layers of the reinforcement layer means having threads defining a second thread angle; and, the first thread angle being less than the second thread angle.

The additional double-layer fabric is arranged during manufacture of the flexible member in a band region which extends from an end of the flexible member. The lesser thread angle of the additional double-layer fabric compared to the thread angle of the reinforcement layer leads, when the diameter of the flexible member is increased in the motor vehicle because of the pressure charge, to the condition that the operating diameter is not obtained in the region of the additional double-layer fabric; instead, a contraction or a diameter reduction of the flexible member of the rolling-lobe air spring is present in this region. This reduced region of the flexible member along the periphery thereof lies opposite to the rolling lobe which moves up and down along the roll-off piston.

In an advantageous embodiment of the invention, the additional rubberized double-layer fabric is arranged in a ring-shaped band region which extends from the clamping region disposed opposite the rolling lobe. This configuration results in a diameter region of the flexible member which is contracted and extends from the clamping region opposite the rolling lobe. The placement of such a rolling-lobe air spring during installation can be carried out in a simple manner.

In a further embodiment of the invention, the additional double-layer fabric extends over only a portion of the periphery of the flexible member of the air spring. If installation conditions require that the periphery of the flexible member be reduced only at a specific location, then the necessary instep or diameter reduction of the flexible member can be realized with a lesser quantity of fabric for the additional double-layer fabric.

In an advantageous manner, the additional double-layer fabric can be arranged between two cord-fiber layers of the reinforcement layer. In this way, a reliable fixation of the additional double-layer fabric is obtained.

With the invention, a reduced installation space is adequate for the installation of the rolling-lobe air spring of the invention since the instep of the flexible member or the reduced diameter region affords the possibility of permitting other installed components to project into the outline of the rolling-lobe air spring. Such other components can be parts of the axle suspension.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
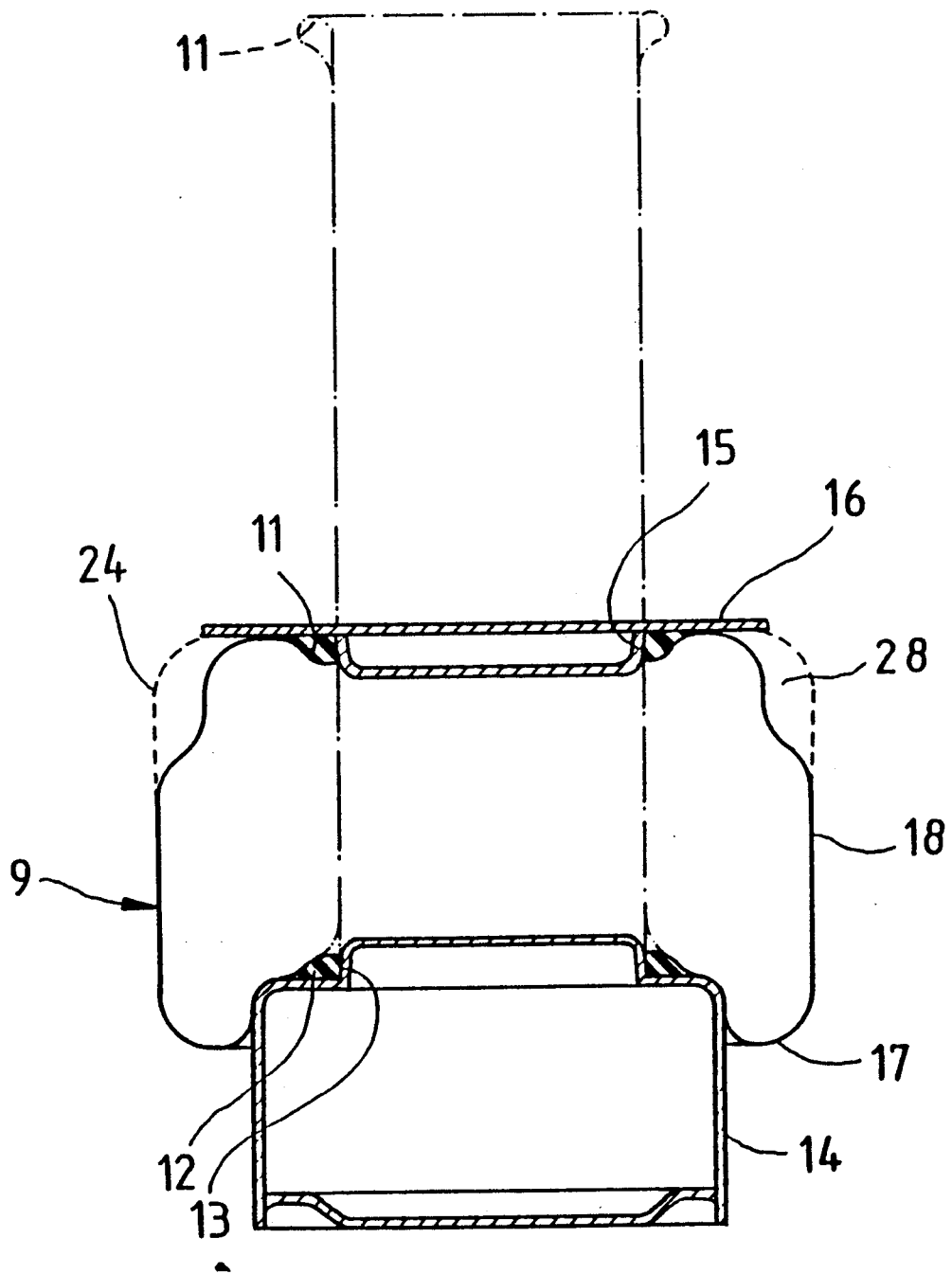
FIG. 1 shows a rolling-lobe air spring according to the invention during assembly (dot-dash lines) and in the operational state wherein the flexible member of the air spring is clamped between two connecting parts.

The rolling-lobe air spring 9 shown in FIG. 1 includes a flexible member 18 having attachment beads 11 and 12 formed on opposite ends thereof. The dot-dashed outline of the cylinder-shaped air spring 9 corresponds to the contour thereof during assembly. In the operating state (solid line), the rolling-lobe air spring 9 is placed under tension by the inner pressure present in the interior space of the air spring. The flexible member 18 of the air spring 9 is essentially a flexible annular wall and includes a lower attachment bead 12 on a conical sealing seat 13 of a roll-off piston 14 which defines one connecting part. The flexible member 18 has an upper attachment bead 11 on a conical sealing seat 15 of a second connecting part 16.

In the operating state of the air spring, the rolling lobe 17 is formed which rolls up and down over the outer wall of the roll-off piston 14 during the reciprocating spring action.

A reinforcement layer 21 (FIG. 2) is embedded in the elastomeric flexible member 18 defining the annular wall of the air spring. The reinforcement layer 21 comprises two mutually-crossing cord-fabric layers 22 and 23. The thread angle of the cord fabric (22, 23) is usually between 50° and 60°.

In addition to this reinforcement layer 21, a double layer fabric 25 is arranged in a ring-shaped band region 24 (FIG. 1) of the flexible member 18. This band region 24 is in the non-rolling region of the flexible member 18. The double-layer fabric 25 extends directly from the attachment bead 11 and likewise comprises two mutually-crossing cord-fabric layers 26 and 27. These two cord-fabric layers 26 and 27 lie between the two cord-fabric layers 22 and 23 of the reinforcement layer 21. The thread angle of the additional double-layer fabric 25 is 5° to 10° less than the thread angle in the reinforcement layer 21.

Figure 2:
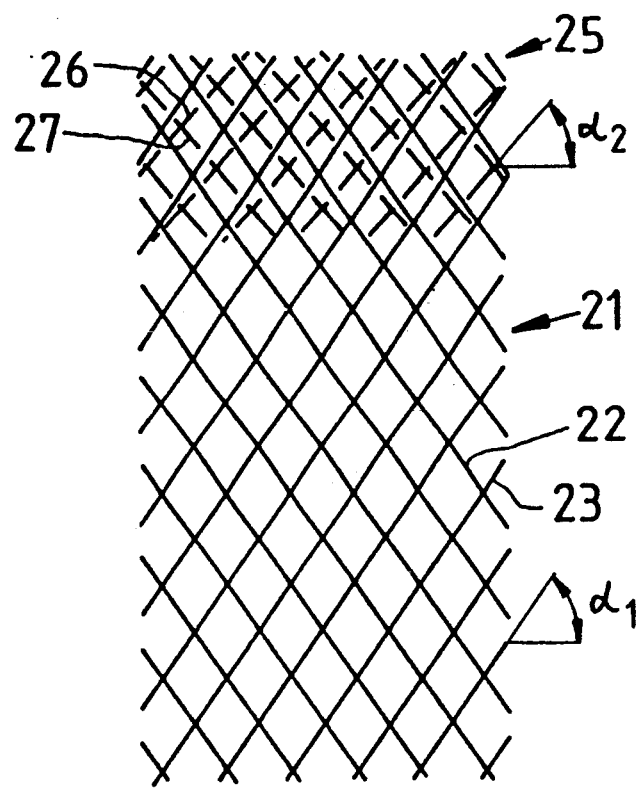
FIG. 2 is a schematic representation of the mutually-crossing cord-fabric layers of the rolling-lobe air spring in the assembly state supplemented with the additional double-layer fabric.
Figure 3:
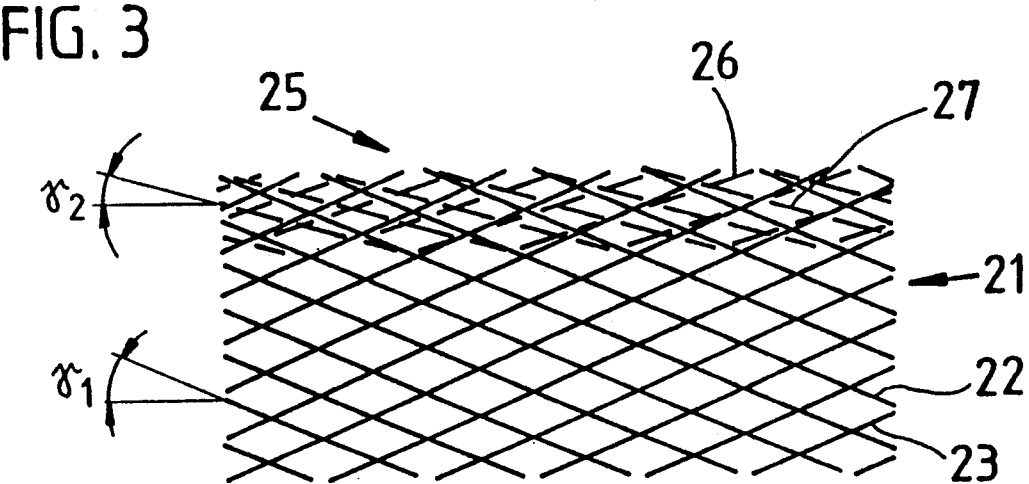
FIG. 3 is a schematic representation of the mutually-crossing cord-fabric layers of the rolling-lobe air spring in the operating state supplemented with the additional double-layer fabric.

In FIG. 2, the reinforcement layer 21 and the additional double-layer fabric 25 are shown in the assembly state of the rolling-lobe air spring 9, that is, in the unpressurized state. The rolling-lobe air spring is expanded in the usual manner to a greater diameter in the vulcanization form by means of inner pressure and heated. When increasing the diameter in the vulcanization form, the cord threads change so that now a lesser angle is produced between the thread direction and the peripheral direction. The condition remains that the thread angles of the additional double-layer fabric 25 are less than the thread angles of the reinforcement layer 21.

The vulcanized flexible member 18 is mounted to the conical sealing surfaces 13 and 15 of the connecting parts 14 and 16, respectively, by means of inner pressure. Because of the inner pressure, the operating diameter of the flexible member 18 is obtained. A reduction 28 of the diameter of the flexible member is obtained in the non-rolling region of the air spring, that is, in the region 24 of the additional double-layer fabric 25. The reduction of the periphery of the flexible member is located in the region opposite the rolling lobe 17 and permits other components of the motor vehicle to project into the outline (dotted line). The installation space is optimally utilized.

Figure 4:
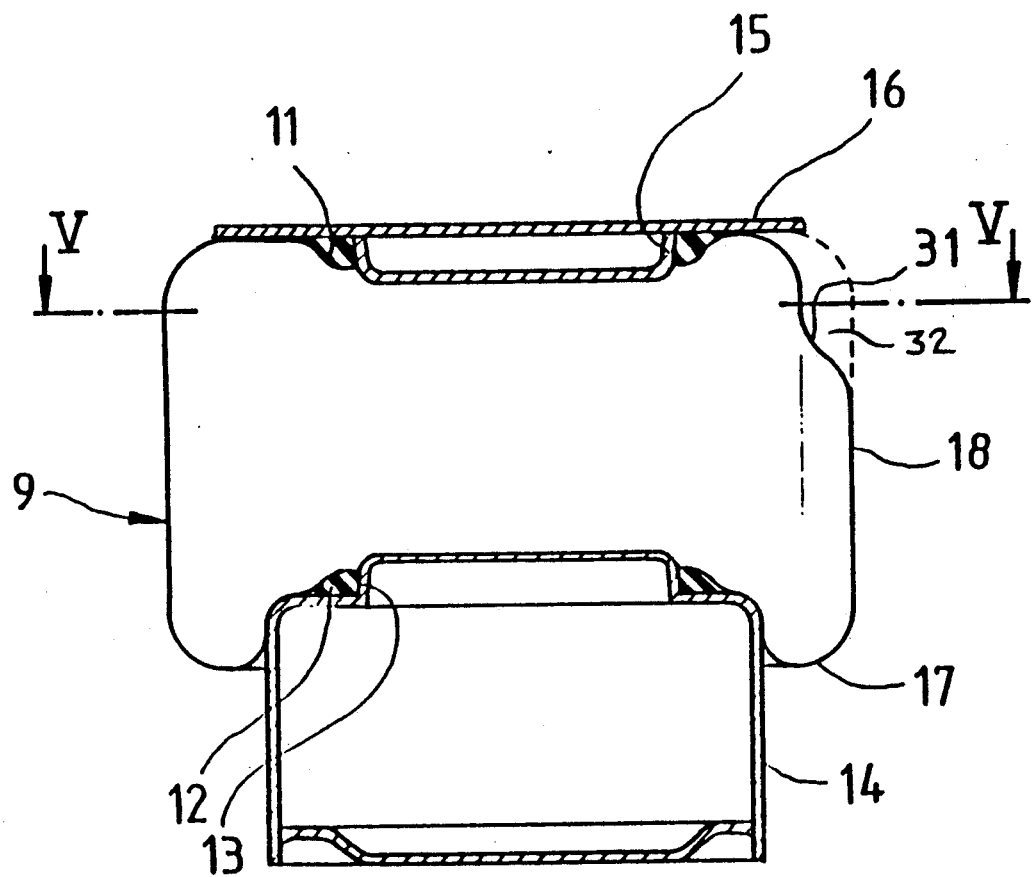
FIG. 4 is a side elevation view, in section, of a rolling-lobe air spring provided with an instep in its outer contour only over a portion of the periphery of the flexible member.
Figure 5:
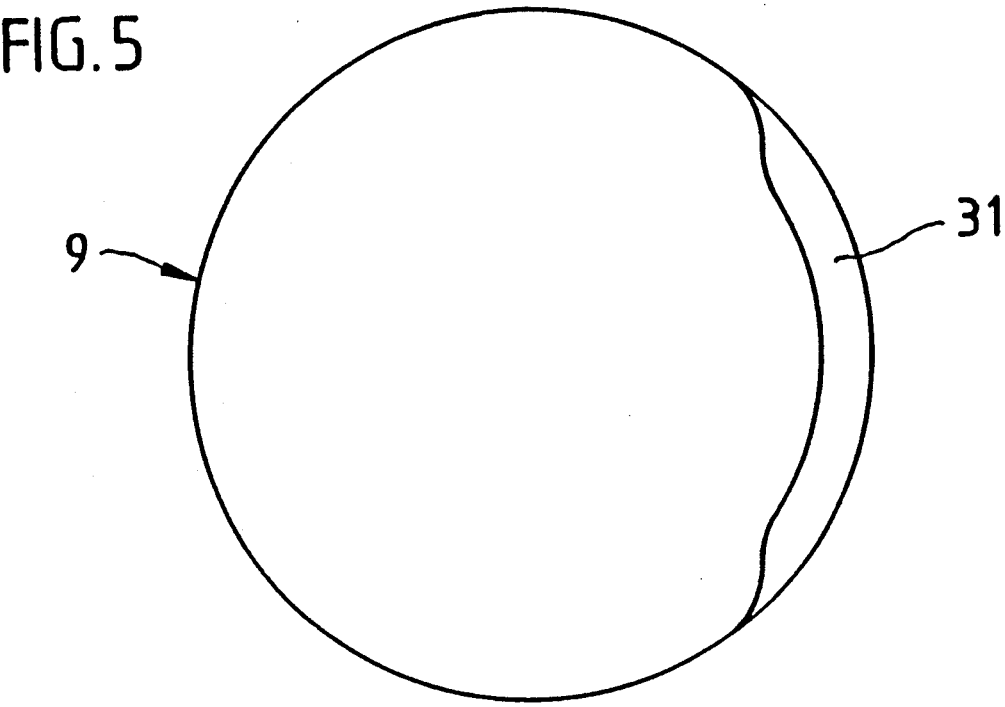
FIG. 5 is a cross section taken along line V—V of FIG. 4.
Figure 6:
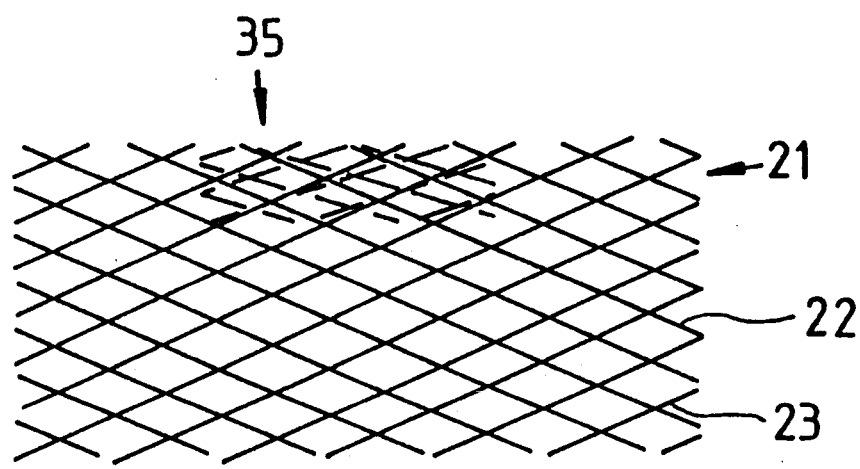
FIG. 6 is a schematic representation of the mutually-crossing fabric layers of the reinforcement layer and the additional double-layer fabric with the latter extending only over a peripheral portion.

The rolling-lobe air spring 9 shown in FIG. 4 includes a step 31 in a portion of its periphery with the step 31 being disposed in the clamping region lying opposite the rolling lobe 17. This step 31 is effected by means of a portion of an additional double-layer fabric 35 which lies between the two cord-fabric layers 22 and 23 of the reinforcement layer 21 (see FIG. 6).

The step 31 occurs in the operating state in the region of the flexible member 18 wherein a rolling lobe is not formed. Other components of the motor vehicle can project into the free space 32 (FIG. 4) made available by the air spring according to the invention.

It is understood that the foregoing description is that of the preferred embodiments of the invention and that various changes and modifications may be made thereto without departing from the spirit and scope of the invention as defined in the appended claims.

What is claimed is:

1. A rolling-lobe air spring for attachment to first and second attachment parts, the second attachment part including a roll-off piston, the rolling-lobe air spring comprising:

an annular wall defining a longitudinal axis and being a flexible member made of elastomeric material;

said annular wall having first and second longitudinal end portions for attachment to said first and second attachment parts, respectively, and said annular wall being a single continuous uninterrupted annular wall between said end portions;

said annular wall having a pregiven longitudinal active portion within which a rolling lobe is formed as said longitudinal active portion rolls back and forth over said roll-off piston during the operation of the air spring and said annular wall having a longitudinal inactive portion within which the rolling lobe is not formed during said operation;

said annular wall having a first diameter at said longitudinal active portion thereof;

said first longitudinal end portion lying opposite said rolling lobe;

reinforcement layer means including two mutually crossing rubberized cord fabric layers arranged in said annular wall so as to extend uninterruptedly over the entire length thereof;

a rubberized double-layer fabric cord arranged in said inactive portion of said annular wall so as to extend in the direction of said axis from said first longitudinal end portion while remaining clear of said pregiven longitudinal active portion of said annular wall;

said rubberized double-layer cord fabric having cords defining a first cord angle and said cord fabric layers of said reinforcement layer means having cords defining a second cord angle; and, said first cord angle being less than said second cord angle so as to cause said annular wall to have a depression formed therein in said inactive portion and said annular wall having a second diameter measured at said inactive portion which is less than said first diameter.

2. The rolling lobe air spring of claim 1, said rubberized double-layer fabric extending over a ring-shaped band region of said annular wall; and, said band region extending from said first end portion while remaining clear of the region of said annular wall taken up by said pregiven longitudinal portion.

3. The rolling lobe air spring of claim 1, said rubberized double-layer fabric extending over only a part of the periphery of said annular wall while remaining clear of the region of said annular wall taken up by said pregiven longitudinal portion.

4. The rolling lobe air spring of claim 1, said rubberized double layer fabric being disposed between said two cord fabric layers of said reinforcement layer means.

5. A rolling-lobe air spring for attachment to first and second attachment parts, the second attachment part including a roll-off piston, the rolling-lobe air spring comprising:

an annular wall defining a longitudinal axis and being a flexible member made of elastomeric material;

said annular wall having first and second longitudinal end portions for attachment to said first and second attachment parts, respectively, and said annular wall being a single continuous uninterrupted annular wall between said end portions;

said annular wall having a pregiven longitudinal active portion within which a rolling lobe is formed as said longitudinal active portion rolls back and forth over said roll-off piston during the operation of the air spring and said annular wall having a longitudinal inactive portion within which the rolling lobe is not formed during said operation;

said annular wall having a first diameter at said longitudinal active portion thereof;

said first longitudinal end portion lying opposite said rolling lobe;

reinforcement layer means including two mutually crossing rubberized cord fabric layers arranged in said annular wall so as to extend uninterruptedly over the entire length thereof;

a rubberized double-layer fabric cord arranged in said inactive portion of said annular wall so as to extend in the direction of said axis from said first longitudinal end portion while remaining clear of said pregiven longitudinal active portion of said annular wall and to extend only over a limited region of said inactive portion of said annular wall measured in the circumferential direction thereof;

said rubberized double-layer cord fabric having cords defining a first cord angle and said cord fabric layers of said reinforcement layer means having cords defining a second cord angle; and, said first cord angle being less than said second cord angle so as to cause said annular wall to have a depression formed therein in said region of said inactive portion and said annular wall having a second diameter measured at said region of said inactive portion which is less than said first diameter.

* * * * *